Figure 1:
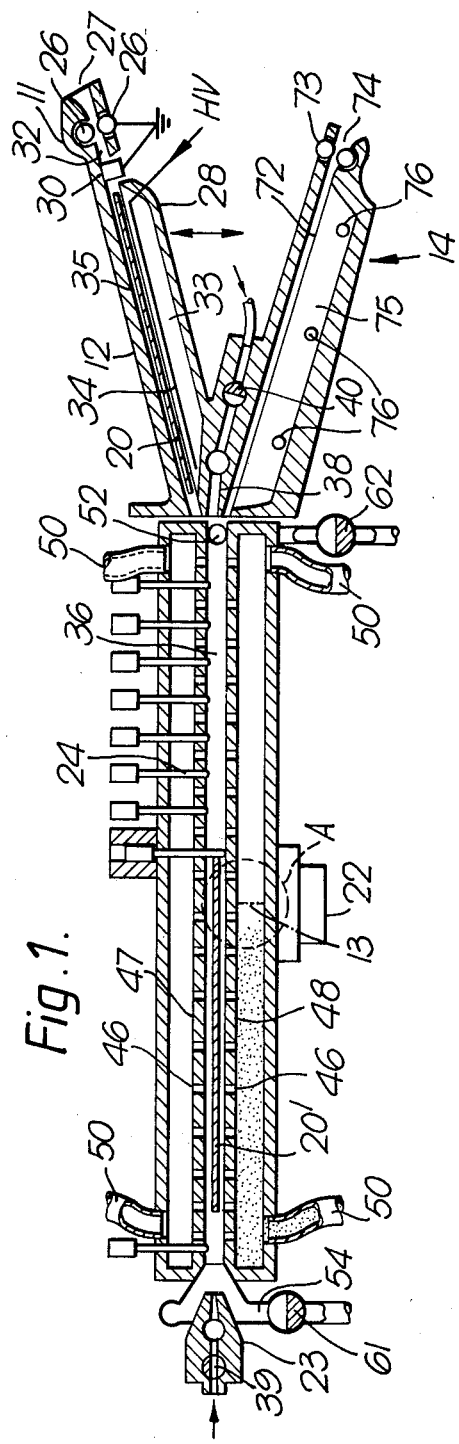

United States Patent [19]

Spence-Bate et al.

[11] 4,240,725
[45] Dec. 23, 1980

[54] ELECTROSTATIC CAMERA

[75] Inventors: Harry A. H. Spence-Bate, Morley, Western Australia 6062, Australia; Timothy Bain-Smith, Charing, England

[73] Assignee: Harry Arthur Hele Spence-Bate, Morley, Australia

[21] Appl. No.: 96,516

[22] Filed: Nov. 21, 1979

[30] Foreign Application Priority Data

Nov. 30, 1978 [GB] United Kingdom ............... 46704/78

[51] Int. Cl.³ ..................... G03B 17/50; G03B 27/42; G03B 27/60; G03G 15/00
[52] U.S. Cl. .......................................... 354/3; 354/83; 355/53; 355/73
[58] Field of Search ................. 354/3, 83; 355/53, 64, 355/73

[56] References Cited

U.S. PATENT DOCUMENTS

| 2,976,144 | 3/1961 | Rose ..................................... 354/3 X |
| 3,528,355 | 9/1970 | Blackert ................................. 354/3 |
| 3,864,035 | 2/1975 | Kuehnle ............................... 354/3 X |

Primary Examiner—Donald A. Griffin
Attorney, Agent, or Firm—Fidelman, Wolffe & Waldron

[57] ABSTRACT

A camera with gas cushion film feed in which an imaging fluid is injected into the cushion so that imaging can take place after exposure of the film which may be either an electrostatic film or silver halide film.

11 Claims, 2 Drawing Figures

U.S. Patent

Dec. 23, 1980

4,240,725

ELECTROSTATIC CAMERA

The present invention relates to recording cameras primarily for microfiche recording but which may also be used for the production of micro printing plates and for preparing plates for printed circuits.

In my copending United Kingdom (Great Britain) patent application No. 41118/76 which corresponds to U.S. Pat. No. 4,176,947 issued Dec. 4, 1979 there is disclosed apparatus for supporting and moving a microfiche film on a layer of gas so that it can easily and rapidly be moved in X and Y directions relative to a camera lens for exposure. Subsequent to exposure the film would be treated in a separate developing unit.

The rapidity of film handling in the exposure stage in such a system is generally not matched by the speed of developing and indeed the provision of separate developing units is expensive and space consuming. It is therefore an object of the invention to provide further improvements in the arrangements for the exposure and treatment of film, the term film hereafter including light sensitive, photo sensitive, electron sensitive materials or materials suitable for laser imaging or electrophotographic or electroradiographic recording.

A recording camera according to the invention comprises image directing means for directing an image on to film as herebefore defined, the image directing means preferably being a lens but also including a laser beam transmitter or X ray or electron beam transmitter, a plate mounted to the camera in the region of the image directing means, means for maintaining a cushion of gas on the plate so as to support the film in a plurality of X and Y positions relative to the image directing means, means for moving the film across the plate to any of the plurality of X and Y positions, and means for directing one or more imaging fluids either liquid or gaseous on to the film after exposure.

Figure 2:
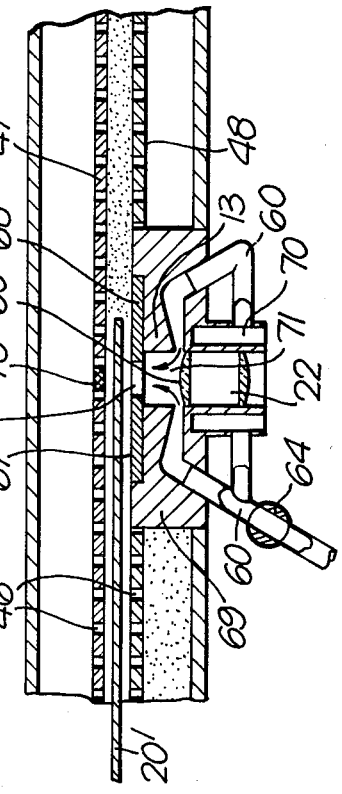

The invention will now be described in detail with reference to the accompanying drawings in which:

FIG. 1 shows an electrostatic recording camera according to the present invention, and FIG. 2 shows a detail of the lens system as at A in FIG. 1.

The camera shown in FIG. 1 is particularly suited for use with photoelectric film composed of a substrate of transparent polyester, an intermediate ohmic layer deposed on a substrate of indium oxide and a photosensitive top layer of cadmium sulphide deposed on the intermediate layer. Such film is produced by Coulter Information Systems Inc. and is described in U.K. Pat. No. 1,438,870.

As with films of this kind which are highly suited for microform recording due to their high discrimination of over 200 lines and possibly up to 1000 lines per millimeter, the film must be grounded and charged before exposure. After exposure toner is applied to the film and generally this is fixed by heat treatment of the toned film. Alternatively a self fixing toner may be used.

Accordingly there is provided for the camera a grounding station 11, a charging station 12, an exposure station 13 and a toner fixing station 14. Toner is applied at the exposure station 13. It is possible that charging may be carried out at the exposure station thus avoiding the provision of a separate charging station. Equally grounding may take place before entering the charging station by using a vacuum platen conveyor or other conveyor to ground the film.

Since the camera is intended primarily for microfiche recording, means are provided for moving the film 20' to any of a plurality of X and Y positions relative to the image directing means, here shown as a lens system 22.

The means for moving the film comprises an air nozzle 23, exit vents such as through fixing station 14 and a plurality of probes 24 which function in a similar fashion to that shown and described in my earlier copending Application No. 41118/76 and the film is supported on a film of air as described in the said earlier application. It has been found that the positoning of the exit vents controls the film movement more than the entry nozzle 23.

At the grounding station 11 earthed grounding rollers 26 act on the substrate and top layer of the film 20 as it enters the film inlet 27 of the vertically movable feed device 28. Immediately adjacent the grounding rollers 26 there are positioned in the inlet a pair of grounding brushes 30 which on either side of the inlet channel 32 act on the intermediate ohmic layer of the film so as to ground this. Grounding is necessary to eliminate stray charges on the film.

The film is subjected to charging by means of a corotron preferably a thin wire 34 fed by high voltage positioned below the film. Control of time and intensity of charge is necessary depending on the type of film and the use for the film. While the film is charged it is held in a groove 35 in charging chamber 33.

As soon as possible after charging the film so as to avoid charge decay the feed device 28 lowers and allows the film to drop into chamber 36 where the film is subject as previously indicated to movement control by air jets from nozzles 23 and 38 opened by valves 39 and 40 respectively. Floating of the film is by means of a gas stream fed from chambers 42 and 44 issuing out of holes 46 in plates 47 and 48.

In order to maintain the lens system clear of toner, ducts 60 which are connected to a low pressure gas source are provided around the lens system 22, the ducts 60 being controlled by a valve 64. The pressure of gas supplied by the ducts is just sufficient to keep the inner lens surface 65 and lens aperture 66 which communicates with chamber 36 clear of toner. The gas pressure may also act so as to keep the microfiche film 20' against the upper plate 46 so as to maintain an accurate back focal length between the lens system and film.

On either side of lens aperture 66 are masking plates 67 and 68 which can be changed in the insulating aperture block 69. If these mask plates are of metal they can be connected to a bias current for concentration toner in the exposed area of film adjacent the lens aperture 66. The lens system 22 is held in lens holder 70 which is detachable from insulating aperture block 69.

After exposure the gas stream is fed with a supply of toner which is fed with the gas, suitably air, through conduits 50 and passes out through ducts 52 and 54.

Flushing of chamber 36 is conducted by opening toner exit valves 61 and 62 in ducts 54 and 52 and by opening clean air valves 40 and 64 while closing valve 39 and toner inlet valves (not shown) for ducts 50. The feed device is moved to its central position during this operation.

The film is blown by means of nozzle 23 towards feed device 28 which is raised to bring slot 72 into line with chamber 36. The film then is blown down the slot and is held by exit feeder rollers 73 and 74 while heat in chamber 75 at toner fixing station 14 is applied by means of heating elements 76 to the film. After the toner is fixed exit rollers 73 and 74 connected to a drive (not shown) rotate to eject the fixed film. Although the film is said to be blown by means of nozzle 23 this is not strictly true since experiment has shown that it is mainly where the blowing medium exits from chamber 36 rather than enters chamber 36. Thus in the embodiment the gas will exit through chamber 14 rather than enter through nozzle 23, and it is the exit of the nozzle gas that ensures the film being moved to feed device 28.

In the embodiment described with reference to FIGS. 1 and 2 the image directing means is specifically lens system 22 mounted in a holder 70 in turn mounted in aperture block 69. In a further embodiment which is not shown, the lens and lens holder may be removable from its operative position and an electron beam transmitter may be pivotable into its place so that computer generated images can be recorded on the microfiche. A suitable transmitter would be a matrix type cathode ray tube similar to that used in the A.B. Dick Videograph system.

In a yet further embodiment the image directing means may be a low power laser beam controlled by known means to produce an image.

If it is desired only to charge one microfiche frame at a time it is possible to omit the corotron charge chamber 33 with its corona producing electrode wire 34 and provide one or a pair of electrode wires in the space 71 between the inner lens surface 65 and aperture 66 as close to the surface 65 as possible so that the wire is out of focus. The space 71 then becomes a corotron charge chamber. Masking plates 67 can be used to intensify the charge on the microfiche frame aligned with the aperture 66.

While the use of an electron beam transmitter has been described it is also possible to adapt the camera for use with electroradiographic image directing means. However the image produced would only be of a small size.

The use of the camera for producing printing plates has been previously mentioned since films which can be treated to produce lithographic plates are currently available. One such use of the present camera would be the production of lithographic plates for microprinting such as is used in the production of large microprinted encyclopedias.

It is also envisaged the present camera could be used in the production of plates for printed circuits whereby computer generated signals can control the movement of the film between plates 46 and the film records the image of a printed circuit. The film can then be treated as for a lithographic plate and the image transferred lithographically on to plates which are then etched in a known way to produce a printed circuit plate. K-C film as produced by Coulter Information Systems, Inc. would seem particularly well adapted for this process. The camera would seem to offer considerable advantages for computer control due to the rapid realignment of the film controlled by liquid or gas (generally fluid) control means.

Colour imaging is also envisaged as being possible in the camera according to the invention. In this case it may be more satisfactory to introduce different colouring toners directly into chamber 71 using a corotron in the same chamber and possibly flushing the chamber by means of ducts 60 in between each colour toner.

Since toner retention on film before fixing is somewhat delicate, it may be advantageous to heat the film to a temporary fixing temperature immediately after exposure of the film and before moving the film to a further frame position and or use a self fixing toner. In this case heater elements would be provided either around the aperture 66 or else on the plate 46 in shaded area 78 opposite the aperture 66 and against which the film can be pressed by air pressure from ducts 60.

While the camera shown has been designed with electrostatic imaging in mind, it is possible to adapt the camera with use with silver halide film, the imaging fluid being a developer and fixer passed through the toner supplying ducts. In this case the charging chamber 33 would not be required.

We claim:

1. A recording camera having a camera lens, plates mounted to the camera in the region of the lens, said plates defining a gas cushion chamber, means for maintaining a cushion of gas in said chamber so as to support a film in a plurality of X and Y positions relative to said lens, means for moving said film across said chamber to any of the plurality of X and Y positions and means for directing at least one imaging fluid on to said film within said chamber after exposure.

2. A camera according to claim 1 wherein the or each imaging fluid is directed into an area adjacent the image directing means.

3. A camera according to claim 1 further comprising means for charging the film.

4. A camera according to claim 1 further comprising grounding means adapted to contact at least the edge of the film.

5. A camera according to claim 4 further comprising a vacuum platen enabled to feed the film to the image directing means and wherein the grounding means is provided on the vacuum platen.

6. A camera according to claim 1 further comprising a film feed device positioned adjacent the plate and adjustable so as to move between a film feed position and a film receive position.

7. A camera according to claim 6 wherein the film feed device is provided with a grounding means adapted to contact at least the edge of the film.

8. A camera according to claim 6 wherein the film feed device is provided with heating means for fixing the imaging fluid.

9. A camera according to claim 1 wherein a lens clearing fluid is arranged to be fed across the imaging path of the lens between the lens and a lens aperture defined by masking means.

10. A camera according to claim 9 wherein the masking means is a metal plate or plates surrounding the lens aperture, which plate or plates are arranged to be connected to a bias current.

11. A camera according to claim 1 wherein a corotron is mounted adjacent the lens and in a masking aperture.

* * * * *